United States Patent [19]

Hagelberg

[11] 4,200,189
[45] Apr. 29, 1980

[54] GRAMMOPHONE RECORD SLEEVE

[75] Inventor: Gabriella Hagelberg, Stockholm, Sweden

[73] Assignee: Bengt Petersson New Products Investment AB, Goteborg, Sweden

[21] Appl. No.: 931,662

[22] Filed: Aug. 7, 1978

[30] Foreign Application Priority Data

May 11, 1978 [SE] Sweden .................................. 7805372

[51] Int. Cl.² .............................................. B65D 85/00
[52] U.S. Cl. .................................... 206/313; 229/68 R
[58] Field of Search ............... 206/307, 308, 309, 310, 206/311, 312, 313; 229/68 R, 87 R

[56] References Cited

U.S. PATENT DOCUMENTS

| 385,197 | 6/1888 | Nolley | 229/87 R |
|---|---|---|---|
| 2,139,654 | 12/1938 | Berkowitz | 229/68 R |
| 2,512,577 | 6/1950 | Franck | 229/68 R |
| 3,005,544 | 10/1961 | Chaplin | 206/313 |
| 3,422,952 | 1/1969 | George | 206/313 |
| 3,547,342 | 12/1970 | Smith | 206/309 X |

FOREIGN PATENT DOCUMENTS 2642908  9/1976  Fed. Rep. of Germany ........... 206/313

*Primary Examiner*—Donald F. Norton

[57] ABSTRACT

The present invention relates to a grammophone record sleeve made of thin material as paper or cardboard and comprising a first section and a second section, which sections are connected to each other and have such a size and shape that they substantially cover a grammophone record intended to be stored between the sections.

According to the invention the two sections are connected along one single edge and the second section is at the edge opposed to said connection edge provided with a third section, shorter than the second section. The grammophone record is intended to be handled for example by putting the same on a turntable, grasped by the hand and in a position between the third section and an edge portion of the second section, while the first section and the main portion of the second section are unfolded from the record.

According to an embodiment the sleeve is provided with a layer of an electric conducting material intended to remove electrostatic charge from the record surfaces.

2 Claims, 10 Drawing Figures

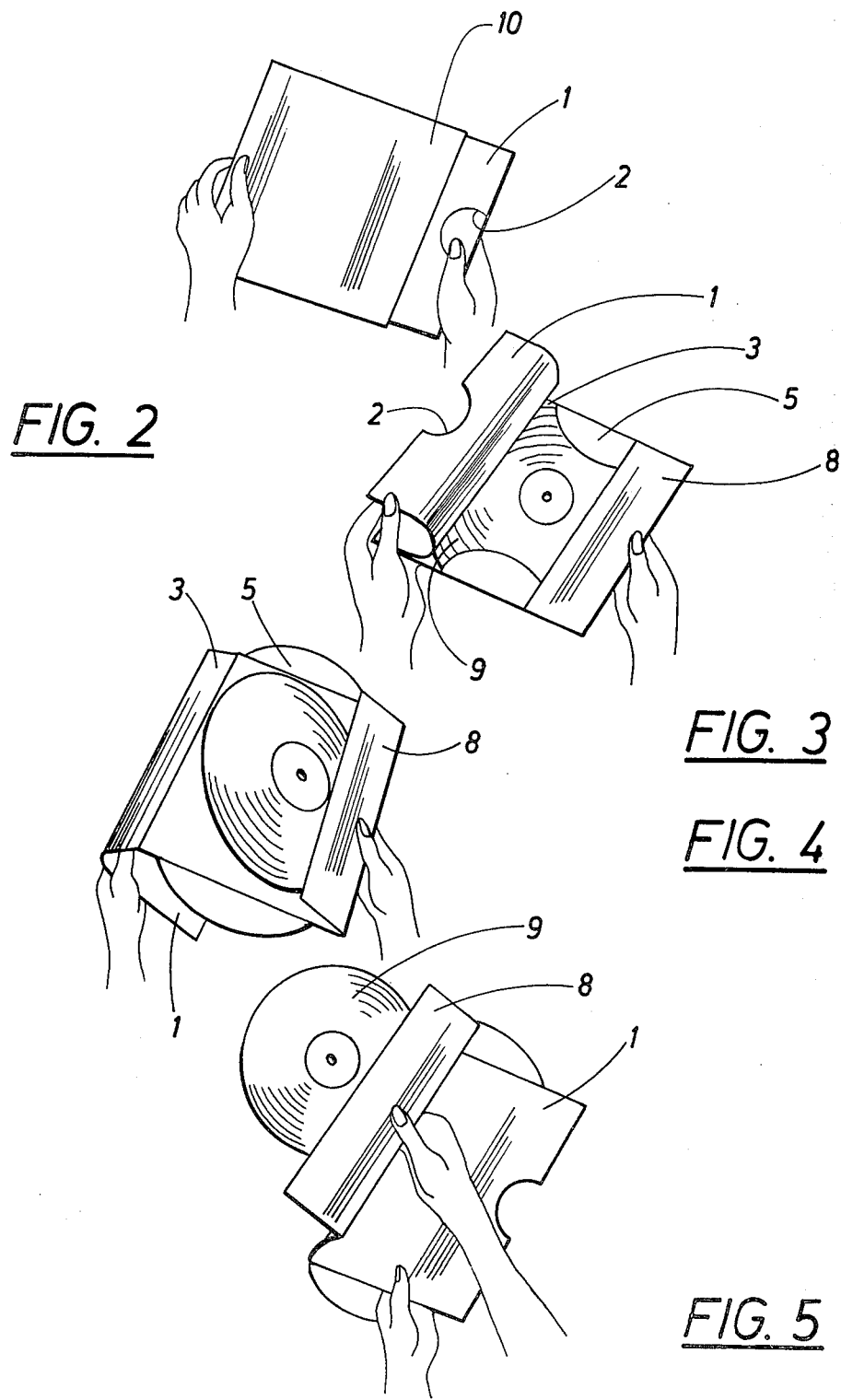

GRAMMOPHONE RECORD SLEEVE

The present invention relates to a grammophone record sleeve made of thin material as paper or cardboard and comprising a first section and a second section, which sections are connected to each other and have such a size and shape that they substantially cover a grammophone record intended to be stored between the sections.

Grammophone records especially so called long-playing records are usually wrapped in an innersleeve of thin soft paper and together with this sleeve in an outer sleeve of stiff cardboard. When a record is to be played it first has to be removed from the outer sleeve together with the inner sleeve and subsequently be taken out from the inner sleeve and be placed on the turntable. As is well known a grammophone record with its fine engraving is easily damaged by scratches and should not be touched with the hands, as grease will then be deposted on the surface. Dust will subsequently be accumulated in the grease and will unfavourably affect the quality of the sound, when the record is played. Therefore the record when taken out from the inner sleeve, which has the form of a flat bag open at one end, must be handled in a very uncomfortable manner. The only possible way to take out the record without touching the engraving with the fingers is to introduce the hand into the sleeve without touching the record and place the four fingers against the label and the thumb against the very edge whereafter the record can be taken out while balancing it on the fingertips. After removal of the record sleeve the record has to be taken with both hands by pressing against the peripheral edge on diametrically opposed sides and with this hold deposit the record on the turntable. When putting down the record into the sleeve the operation takes place in inverted order. Thus after grasping the record with the fingertips of both hands it has to be caught with the fingertips and the thumb of one hand and subsequently inserted into the sleeve, whereafter the hand has to be withdrawn without touching the record. In connection with these manipulations it is impossible to avoid that the record slides against the walls of the sleeve, which can give rise to scratches. In order to prevent this, the innersleeves are often made of a special soft paper or of paper lined with a plastics layer in order to avoid contamination by particles of fluff from such paper.

As mentioned the dust collected on the record causes considerable trouble and disturbances. Modern records of plastics material are charged with static electricity when played and handled, and because thereof they will attract dust. If the dust is not removed, the quality of the sound will be very bad as a result of particles of greater size causing clicks in the loudspeaker because the finest dust in the grooves of the record produces a distorsion of the sound when the record is played.

A great many auxiliary means have been created in order to remove the dust from the grammophone record before it is played. Also means provided to remove the electrostatic charge are known. However, these auxiliary means complicate the playing and have but a limited effect with respect to the removal of the finest dust particles from the groove of the record where they are fixed by the electrostatic force.

It is an object of the present invention to provide a device in the form of an inner sleeve by means of which a discharge of the grammophone record occurs in connection with its storing.

It is also an object of the invention to provide a record sleeve which is simple to manufacture and requires less handling operations than the design of the prior art.

It is still another object of the invention to provide a record sleeve which can be removed from the record without any sliding between the record and the sleeve which can give rise to scratches.

Four embodiments of the record sleeve according to the invention are illustrated in the accompanying drawings.

FIGS. 2–5 illustrate different positions of use.

Figure 1:
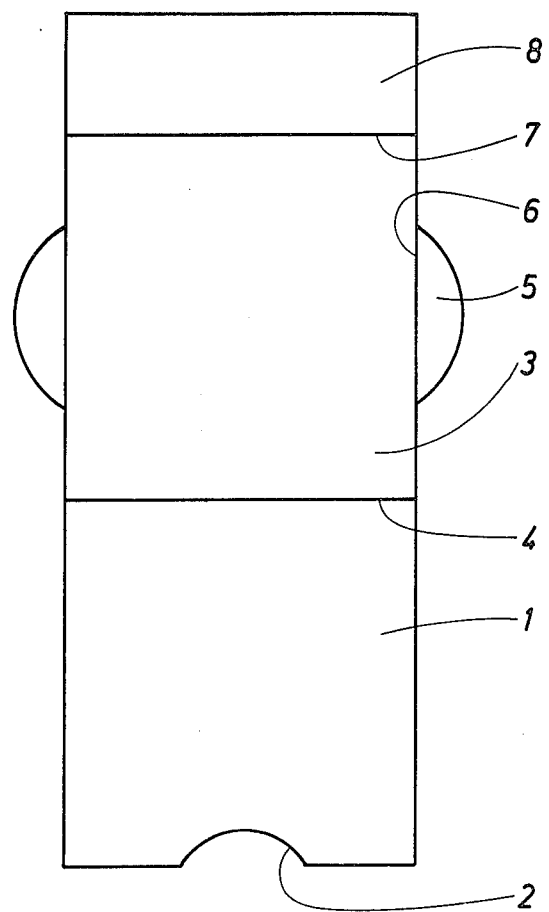
FIG. 1 shows an extension of the sleeve.

The basic ideas behind the record sleeve is that the surfaces, which shall be in contact with the sides of the record, shall be electrically conducting and that said conducting surfaces shall be in contact with a conducting surface that will be grasped with the hand when the sleeve is handled. By this arrangement the sides of the record are grounded via the conducting surfaces of the body of the person handling the sleeve, so that the electrostatic charge of the record is removed. If the record is placed in the sleeve immediately after it has been played, the discharge takes place so soon after it has been charged with static electricity that the exposition to dust and the resulting dust collection will be of the smallest possible degree. As long as the record is stored in the conducting sleeve, it has not any tendency to accumulate dust. After its removal from the sleeve, the record is discharged and has no tendency to attract particles of dust.

A metal as aluminum is a good conductor and therefore yields the best result. However, aluminum foil cannot be used as it is easy to wrinkle. As a consequence thereof it gets a poor adhesion to the record and the wrinkled surface can easily scratch the sides of the record. However, so called aluminum lined paper, i.e. paper lined with a very thin aluminum foil is an excellent material. The paper maintains the foil in a straightened out condition without any sharp cockles appearing. The aluminum foil must have an uninterrupted continuation on the outside of the sleeve, so that it will give a contact with the hand, when the sleeve is handled.

A record sleeve made of aluminum lined paper as described has no tendency to attract dust. Dust, that possibly falls down on the surfaces of the sleeve, easily falls off or can be shaken away. Also in this respect the record sleeve shows advantageous differences from record sleeves of the prior art. Sleeves of paper or plastics of the hitherto common type have in itself a tendency to be electrically charged and accumulate dust, which is transferred to the record. There is also an additional risk that the sides of the sleeve get charged in connection with the extraction of the record from and its insertion into the sleeve. Also these drawbacks are eliminated by means of the sleeve described.

In order to investigate the effects of the record sleeve the following tests were made:

1. A grammophone record was charged with static electricity by playing it.

2. The record was brought into contact with a textile material, whereby great quantities of textile dust got deposited on the sides of the record.

3. The same procedure was repeated, but between the playing operation and the contact with the textile material the record for a short interval was inserted into a record sleeve of plastics lined paper. Only an insignificant reduction of the tendency of dust accumulation could be noticed.

4. The procedure was repeated, but between the playing operation and the contact with the textile material the record for a short interval was inserted into a record sleeve of aluminum lined paper, the aluminum layer of which was grounded by means of the hand. The record thereafter was completely discharged and proved to be almost entirely free from any tendency to collect dust.

According to FIG. 1 the record sleeve is made of a sheet of a soft pliable paper with at least one surface so soft and free from impurities that it is suitable to adhere to a grammophone record without any scratches arising. The paper sheet exhibits a first section 1, which is substantially square with a dimension which somewhat exceeds the diameter of the grammophone record intended to be inserted into the sleeve. The section 1 has a cut 2, which is intended to leave space for the thumb.

The next section 3 of the paper sheet is defined from the part 1 by a folding line 4. The section 3 substantially has the same size as the section 1. Two flaps 5 project from the section 3 at the two edges of the paper sheet connected by means of the folding line 4, which flaps connect with the section 3 by means of folding lines 6. The paper sheet is terminated by a section 8 past a folding line 7, which is parallel to the folding line 4. Said section 8 has the same width as the sections 1 and 3 but is much shorter and leaves only place for the thumb when the sleeve is held with an inserted record inside, as will be described in the following.

In the following the section 1 will be called the first section, the section 3 the middle section and the section 8 the end section.

As one can conclude from FIG. 3 a grammophone record 9 when stored in the sleeve, is lying against the middle section 3, the end section 8 and the flaps 5 being folded over the record. The first section 1 is finally folded down over the record, the end section 8 and the flaps 5. However, in FIG. 3 the section 1 is shown halfways folded upwards, but in FIG. 2 it is shown how the section 1 is folded down over the end section 8. In this position a closed sleeve for the grammophone record is formed by the different sections of the paper sheet, which sleeve easily can be kept together without any risk of the record falling out, if the sleeve is held with the record inside in a grip over the edge of the section 1 at the side of the cut 2.

The grip mentioned is illustrated in FIG. 2. In this position the record can easily be extracted together with the sleeve out of the usually existing outer sleeve 10, and the record can be carried by means of this grip. When the record is going to be played the thumb is moved a little, so that it will be placed in the cut 2, whereafter the section 1 is folded out from the record 9, as is shown in FIG. 3. By means of continuous unfolding of the first section 1 also the middle section 3 is folded out from the record, whereby the flaps 5 by themselves are bent outwards over the edge of the record, as is shown in FIG. 4. In the final condition the hand holds around the record by means of a pinching grip over the end section 8 and the edge portion of the middle section 3 positioned close to the folding line 7. The first section 1 and the main portion of the middle section 3 are, however, kept aside in a backwards folded condition, as is shown in FIG. 5 which is performed by means of the original finger grip around the edge of the first section according to FIG. 3.

Thus, counted from the extraction out of the outer sleeve 10 one has freed the record from the sleeve while retaining it in a single pinching grip around its edge without having to touch the vary surface of the record. In the final grip illustrated in FIG. 5 the record can easily be laid on the turntable, the sleeve still accompanying the same. Most turntables are in fact somewhat smaller than the usually common long-playing records, and therefore the pinching grip illustrated in FIG. 5 permits the deposition of the record without difficulty. After placing the record on the turntable, the sleeve is pulled aside and the record can be played. In those cases where the turntable is just as big as the record, one must see to it that the pinching grip is formed by the thumb and the forefinger only, so that the record in an oblique position can be moved over the center pin of the turntable with the forefinger between the record and the turntable. Finally one withdraws the hand together with the record sleeve and the record falls down on the turntable.

When the record is going to be removed from the turntable it is grasped by the edge with the record sleeve around the same using the same pinching grip as is illustrated in FIG. 5 keeping the first section 1 aside with the other hand whereafter the record is removed. With the other hand the first section 1 is folded over so that the sleeve will be ready for insertion into the outer sleeve 10, as is shown in FIG. 2. In connection with turntables of the bigger type one can, in connection with the removal of the record, turn the sleeve with the edge section 8 downwards and push in said section 8 inwards between the record and the turntable, whereafter it is easy to remove the record.

The flaps only have the function to retain the record in the sleeve, if one tilts the same in sidewise direction and at the same time loosens the grip around the sleeve. Then the record would slide out, if the flaps 5 had not been there to prevent this. However, the flaps 5 are not necessary, if the sleeve is always kept in a sufficiently strong pinching grip, so that the record is retained by means of the friction.

Figure 6:
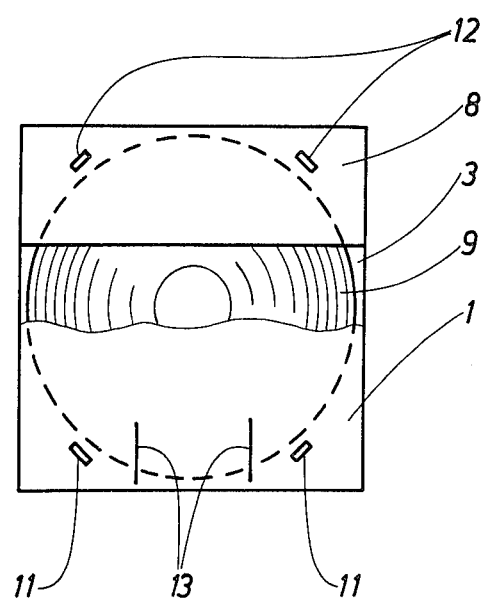
FIG. 6 shows the second embodiment.

However, the flaps can be avoided and the record can be protected from falling out in connection with a loose grip, if the sleeve is made according to the second embodiment, FIG. 6. According to this embodiment the sleeve is still easier to handle as the flaps 5 of the first embodiment when folding the sleeve require a special folding in operation.

Thus, in the second embodiment the flaps 5 are missing, while other sections of the sleeve are substantially unchanged. According to FIG. 6 which shows the sleeve in folded condition and with a portion of the first section 1 cut away the second embodiment thus exhibits the section 1 with substantially the same design as in the first embodiment, thus with a cut 2 (not shown in the figure) a middle section 3 and an end section 8. The folding lines 4 and 7 can also be found, the flaps 5 on the other hand, as mentioned, missing. The difference between the two embodiments consists in the sections 1 and 3 in the second embodiment being connected with each other at the points 11, the section likewise being connected with the section 3 at two points 12. By this arrangement four stops for the record are created in order to catch the same in case the sleeve is inclined. The connection points 12 of course prevent the sections 3 and 8 from being totally folded out from each other along the folding line 7, but this does not imply any drawback, as the sleeve functions in such a way that the edges of said sections round the folding line 7 are pulled straight outwards from the record, as has been evident from the preceding description. The connection points 11 likewise impede the sections 1 and 3 to entirely fold out from another. However, if the connection point is drawn over the edge of the record the paper will allow under a certain reforming. This is facilitated, if the section 1 or possibly instead the section 3 is provided with two slits 13. The connection of the paper layers can take place by means of glueing, selfadhesive elements or for example staples.

It is evident that the record sleeve according to the invention is simpler to manufacture than a common baglike sleeve and that the selection of material is less sensitive on account of any sliding against the record will not necessarily take place.

Figure 7:
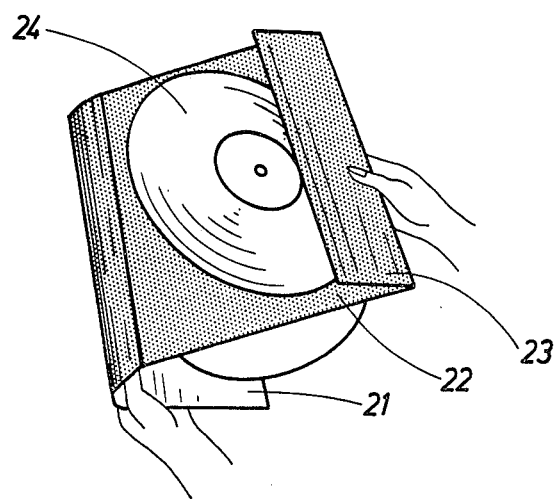
FIG. 7 is a view of a record sleeve according to the third embodiment.
Figure 8:
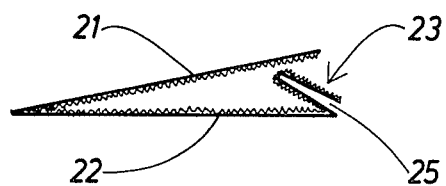
FIG. 8 is a schematical cross-sectional view of the third embodiment.

The record sleeve illustrated in FIGS. 7 and 8 is made as has been described above. The record sleeve is made of a sheet of paper, which is folded to form three sections 21, 22 and 23 corresponding to the sections 1, 3 and 8 respectively, described in the foregoing. The paper sheet is lined on one side with a thin aluminum foil. The side with aluminum foil is hinted with a screen pattern in FIG. 7 and in the form of a corrugated line in FIG. 8. As is evident from the figures, it is thus the sides of the sections 21 and 22 facing the record which are provided with aluminum foil and the section 23 is completely covered with aluminum foil. In order to insure that the flap 23 will be coated with aluminum foil on both sides, it is, according to FIG. 8, double folded and the paper is glued at the point indicated with 25. (For clarity's sake the glued point 25 is shown slightly folded in upwards direction.)

The flap forming the section 23 thus has an outer aluminum coating, which is in connection with the rest of the aluminum layer, thus also with the aluminum coating facing the sides of the record. Because of the fact that the record sleeve shall be grasped with the hand on top of the flap 23, as is shown in FIG. 3, the hand will get in conducting connection with the entire aluminum layer. As the aluminum layers of the sections 21, 22 will get in connection with the sides of the record, when the record 24 is inserted into the sleeve, all static electricity from the sides of the records will be conducted away by means of the hand via the uninterrupted aluminum layer. The folding of the flap forming the section 23 must of course take place in such a manner that the aluminum layer is not broken.

Figure 9:
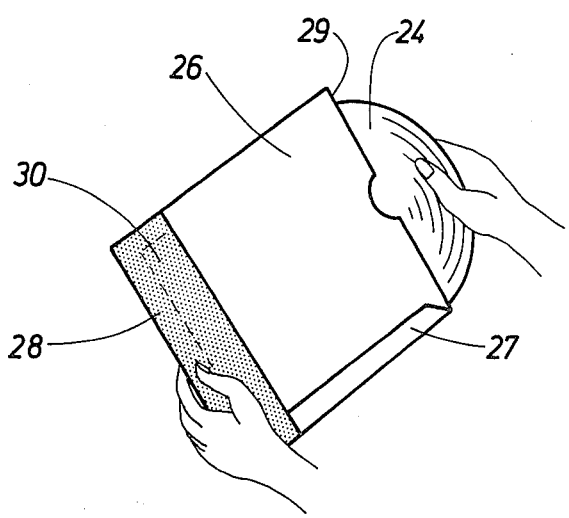
FIG. 9 is a view of a record sleeve according to the fourth embodiment.
Figure 10:
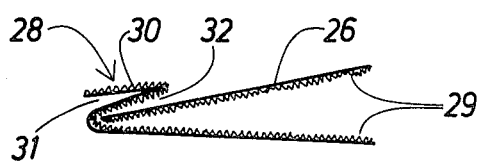
FIG. 10 is a schematic cross-sectional view of the fourth embodiment.

A record sleeve of conventional design of a baglike model is illustrated in FIGS. 9 and 10. The sleeve is formed by a folded paper sheet 26, which along two edges is joined by a flap 27 and a flap 28. By this arrangement an open side 29 is formed, where the grammophone record 24 can be inserted into and extracted from the sleeve. The paper sheet 26 is aluminum lined, the aluminum side being turned inwards. However, the flap 28 is double folded as is shown in FIG. 10 and thereby an outer band 30 of the aluminum coating is formed. The band is in connection with the inner aluminum coating, and thus, the sides of the records can be grounded by the hand when the sleeve is grasped in the manner illustrated in FIG. 9. The points 31 and 32 at the flap 28 are glued points, which for clarity's sake have been folded upwards in the drawing.

Irrespective of which general design the sleeve is, the fundamental idea behind the invention is that the inner surfaces of the sleeve facing the sides of the record shall be provided with a conducting coating which is in leading connection with at least one outer conducting surface, which occupies such a position that it is grasped by the hand, when the sleeve is handled in connection with the insertion and the extraction of the record. As mentioned an aluminum lined paper is a suitable material for the sleeve, but also an aluminum coating printed on a paper can be imagined. Also a metallized plastics foil or a foil coated with a metal can be used as material. A conducting coating can also be obtained by means of carbon e.g. printing ink, which, however, does not give the same rapid and complete discharging effect as a metal on account of the poorer conducting property of carbon.

I claim:

1. Grammophone record sleeve made of a thin material, such as paper or cardboard, and comprising a first section and a second section, said sections being connected to each other and having such a size and shape that they are substantially adapted to cover a grammophone record intended to be stored between said sections, said sections at least on their insides being coated with an electrically conducting layer, said electrically conducting layer being connected with at least one surface of an electrically conducting layer on the outside of the sleeve, said sections being connected only along one edge, and the second section at one edge opposed to said connection edge being provided with a third section which in the storing condition of use is in a position between the two sections, the third section having a limited extension from the edge connecting the second section so that it covers the grammophone record only at an edge portion of the same, with the inside of the first and the second section and the third section on its outside, being coated with the electrically conducting layer.

2. Grammophone record sleeve according to claim 1, in which the electrically conducting layer has the form of a lining of metal foil on a paper base.

* * * * *